United States Patent
Bookbinder et al.

(10) Patent No.: US 9,429,731 B2
(45) Date of Patent: Aug. 30, 2016

(54) OPTICAL FIBER CABLE ASSEMBLY COMPRISING OPTICAL TRACER FIBER

(71) Applicant: Corning Optical Communications LLC, Hickory, NC (US)

(72) Inventors: Dana Craig Bookbinder, Corning, NY (US); Edward John Fewkes, Corning, NY (US); Stephan Lvovich Logunov, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/336,197

(22) Filed: Jul. 21, 2014

(65) Prior Publication Data

US 2015/0043875 A1 Feb. 12, 2015

Related U.S. Application Data

(60) Provisional application No. 61/864,778, filed on Aug. 12, 2013.

(51) Int. Cl.
*G02B 6/44* (2006.01)
*F21V 8/00* (2006.01)

(52) U.S. Cl.
CPC ............. *G02B 6/447* (2013.01); *G02B 6/4482* (2013.01); *G02B 6/001* (2013.01)

(58) Field of Classification Search
CPC ..... G02B 6/447; G02B 6/4482; G02B 6/001
See application file for complete search history.

(56) References Cited

U.S. PATENT DOCUMENTS

| 3,942,859 A | 3/1976 | Korodi |
| 4,412,936 A | 11/1983 | Khmelkov et al. |

(Continued)

FOREIGN PATENT DOCUMENTS

| CN | 200941319 Y | 8/2007 |
| CN | 201419706 Y | 3/2010 |

(Continued)

OTHER PUBLICATIONS

"Diode Lasers, Fiber Optics, IR, Red, Green, Blue Diode Lasers, Laser Diode, Fiber Illuminators, Fiber Optics, Coupler, Galvonameters, Laser Show Acessories," Jan. 1, 2013, http://www.meshtel.com/, 1 page.

(Continued)

*Primary Examiner* — Peter Radkowski
(74) *Attorney, Agent, or Firm* — Robert L Branham

(57) ABSTRACT

An optical fiber cable assembly includes an optical tracer fiber, an optical data transmission fiber, and a cable jacket. The optical tracer fiber defines a tracer scattering profile having a scattering loss of >15 dB/km at a tracer wavelength or wavelength range $\lambda_T$ that lies in a visible spectrum. The optical tracer fiber is wound about a longitudinal axis of the optical fiber cable assembly and is either physically coupled to the cable jacket or contained within an inside diameter of the cable jacket. The cable jacket may be engineered to generate light at an optically visible shifted tracer wavelength or wavelength range $\lambda_T^*$ from visible light at the tracer wavelength or wavelength range $\lambda_T$. The cable jacket may include an optically reflective material such that a portion of dispersed visible light from the optical tracer is reflected by the optically reflective material of the cable jacket.

27 Claims, 4 Drawing Sheets

(56) References Cited

U.S. PATENT DOCUMENTS

| | | | |
|---|---|---|---|
| 4,557,552 A * | 12/1985 | Newton et al. | 385/32 |
| 4,755,018 A | 7/1988 | Heng et al. | |
| 4,923,274 A | 5/1990 | Dean | |
| 5,006,806 A * | 4/1991 | Rippingale et al. | 324/326 |
| 5,017,873 A * | 5/1991 | Rippingale et al. | 324/326 |
| 5,040,867 A | 8/1991 | de Jong et al. | |
| 5,122,750 A * | 6/1992 | Rippingale et al. | 324/326 |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A * | 7/1994 | Kingstone | 385/100 |
| 5,377,292 A | 12/1994 | Bartling et al. | |
| 5,394,496 A | 2/1995 | Caldwell et al. | |
| 5,463,706 A | 10/1995 | Dumont et al. | |
| 5,666,453 A | 9/1997 | Dannenmann | |
| 5,764,043 A | 6/1998 | Czosnowski et al. | |
| 5,982,967 A | 11/1999 | Mathis et al. | |
| 6,137,935 A | 10/2000 | Bohme et al. | |
| 6,173,097 B1 | 1/2001 | Throckmorton et al. | |
| 6,257,750 B1 | 7/2001 | Strasser et al. | |
| 6,293,081 B1 * | 9/2001 | Grulick et al. | 57/293 |
| 6,311,000 B1 | 10/2001 | Schneider | |
| 6,314,713 B1 * | 11/2001 | Fitz et al. | 57/293 |
| 6,317,553 B1 | 11/2001 | Harper, Jr. et al. | |
| 6,347,172 B1 * | 2/2002 | Keller et al. | 385/102 |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,519,396 B2 | 2/2003 | Schneider et al. | |
| 6,532,328 B1 | 3/2003 | Kline | |
| 6,554,485 B1 | 4/2003 | Beatty et al. | |
| 6,560,390 B2 * | 5/2003 | Grulick et al. | 385/100 |
| 6,596,943 B1 | 7/2003 | Ward | |
| 6,606,431 B2 | 8/2003 | Unsworth | |
| 6,678,449 B2 | 1/2004 | Thompson et al. | |
| 6,695,491 B1 | 2/2004 | Leeman et al. | |
| 6,710,254 B2 | 3/2004 | Yueh | |
| 6,712,524 B2 | 3/2004 | Beatty et al. | |
| 6,728,453 B2 * | 4/2004 | Petryszak | 385/104 |
| 6,798,956 B2 * | 9/2004 | Morrison | 385/100 |
| 6,816,661 B1 | 11/2004 | Barnes et al. | |
| 6,823,120 B2 | 11/2004 | Hurley et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 7,029,137 B2 * | 4/2006 | Lionetti et al. | 362/84 |
| 7,038,135 B1 | 5/2006 | Chan et al. | |
| 7,049,937 B1 | 5/2006 | Zweig et al. | |
| 7,121,707 B2 | 10/2006 | Currie et al. | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,401,961 B2 * | 7/2008 | Longatti et al. | 362/551 |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,603,020 B1 | 10/2009 | Wakileh et al. | |
| 7,653,277 B2 | 1/2010 | Andrews et al. | |
| 7,671,279 B2 | 3/2010 | Yin | |
| 7,748,860 B2 | 7/2010 | Brunet | |
| 7,920,764 B2 | 4/2011 | Kewitsch | |
| 7,932,805 B2 | 4/2011 | Darr et al. | |
| 7,948,226 B2 * | 5/2011 | Rathbun et al. | 324/66 |
| 8,000,576 B2 * | 8/2011 | Chen et al. | 385/128 |
| 8,102,169 B2 | 1/2012 | Law et al. | |
| 8,150,227 B2 | 4/2012 | Kewitsch | |
| 8,167,471 B1 | 5/2012 | Moritz | |
| 8,314,603 B2 | 11/2012 | Russell | |
| 8,322,871 B1 * | 12/2012 | Knaggs et al. | 362/84 |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,545,076 B2 * | 10/2013 | Bickham et al. | 362/558 |
| 8,548,293 B2 * | 10/2013 | Kachmar | 385/101 |
| 8,591,087 B2 * | 11/2013 | Bickham et al. | 362/558 |
| 8,620,123 B2 | 12/2013 | Dean, Jr. et al. | |
| 8,620,125 B2 | 12/2013 | Button et al. | |
| 8,708,724 B2 | 4/2014 | Patel et al. | |
| 8,724,942 B2 | 5/2014 | Logunov et al. | |
| 8,787,717 B2 | 7/2014 | Logunov | |
| 8,798,419 B2 | 8/2014 | Wessels, Jr. et al. | |
| 8,805,141 B2 | 8/2014 | Fewkes et al. | |
| 8,896,286 B2 | 11/2014 | Abuelsaad et al. | |
| 8,896,287 B2 | 11/2014 | Abuelsaad et al. | |
| 8,903,212 B2 * | 12/2014 | Kachmar | 385/100 |
| 8,909,013 B1 | 12/2014 | Jiang et al. | |
| 2001/0048797 A1 | 12/2001 | Van Dijk et al. | |
| 2002/0009282 A1 * | 1/2002 | Grulick et al. | 385/147 |
| 2002/0037133 A1 | 3/2002 | Unsworth | |
| 2002/0185299 A1 | 12/2002 | Giebel | |
| 2003/0002830 A1 * | 1/2003 | Petryszak | 385/111 |
| 2003/0016924 A1 | 1/2003 | Thompson et al. | |
| 2003/0206519 A1 * | 11/2003 | Sanders et al. | 370/230 |
| 2004/0022504 A1 | 2/2004 | Hurley et al. | |
| 2004/0146254 A1 * | 7/2004 | Morrison | 385/100 |
| 2004/0160774 A1 * | 8/2004 | Lionetti et al. | 362/253 |
| 2004/0179777 A1 | 9/2004 | Buelow, II et al. | |
| 2005/0052174 A1 | 3/2005 | Angelo et al. | |
| 2005/0089267 A1 | 4/2005 | Ma | |
| 2006/0140562 A1 | 6/2006 | Joseph et al. | |
| 2006/0232385 A1 | 10/2006 | Scherer et al. | |
| 2006/0285350 A1 | 12/2006 | Wang | |
| 2007/0153508 A1 | 7/2007 | Nall et al. | |
| 2008/0080820 A1 | 4/2008 | Andrews et al. | |
| 2008/0121171 A1 | 5/2008 | Hulsey | |
| 2008/0198618 A1 | 8/2008 | North | |
| 2008/0204235 A1 | 8/2008 | Cook | |
| 2008/0273844 A1 | 11/2008 | Kewitsch | |
| 2009/0297104 A1 * | 12/2009 | Kachmar | 385/101 |
| 2010/0021114 A1 * | 1/2010 | Chen et al. | 385/116 |
| 2010/0148747 A1 * | 6/2010 | Rathbun et al. | 324/66 |
| 2010/0166374 A1 | 7/2010 | Lapp | |
| 2011/0034068 A1 | 2/2011 | Russell | |
| 2011/0103757 A1 | 5/2011 | Alkemper et al. | |
| 2011/0122646 A1 * | 5/2011 | Bickham et al. | 362/554 |
| 2011/0150488 A1 | 6/2011 | Kewitsch | |
| 2011/0305035 A1 * | 12/2011 | Bickham et al. | 362/558 |
| 2012/0019900 A1 | 1/2012 | Kitson et al. | |
| 2012/0219259 A1 | 8/2012 | Kewitsch | |
| 2012/0275178 A1 | 11/2012 | Logunov | |
| 2012/0275180 A1 | 11/2012 | Button et al. | |
| 2012/0275745 A1 | 11/2012 | Logunov | |
| 2013/0021597 A1 | 1/2013 | Carlson, Jr. et al. | |
| 2013/0088888 A1 | 4/2013 | Fewkes et al. | |
| 2013/0107565 A1 | 5/2013 | Genier | |
| 2013/0201001 A1 | 8/2013 | Ratnakar | |
| 2013/0209045 A1 | 8/2013 | Dean, Jr. et al. | |
| 2014/0016904 A1 * | 1/2014 | Kachmar | 385/100 |
| 2014/0070639 A1 | 3/2014 | Tamura | |
| 2014/0363134 A1 | 12/2014 | Bookbinder et al. | |
| 2015/0049992 A1 | 2/2015 | Bauco | |

FOREIGN PATENT DOCUMENTS

| | | | |
|---|---|---|---|
| CN | 102589728 A | 7/2012 | |
| CN | 201305952 U | 7/2012 | |
| DE | 4413597 A1 | 10/1995 | |
| DE | 10239602 B3 | 2/2004 | H01B 7/36 |
| DE | 10239602 B3 | 2/2004 | |
| DE | 102007025494 A1 | 12/2008 | |
| EP | 0874191 A2 | 10/1998 | |
| EP | 0952589 A2 | 10/1999 | |
| EP | 1168025 A2 | 1/2002 | |
| EP | 1168025 A2 | 2/2002 | G02B 6/44 |
| GB | 2260198 A | 4/1993 | |
| GB | 2375898 A | 11/2002 | |
| JP | 57011305 A | 6/1980 | |
| JP | 59182404 A | 4/1983 | |

(56) References Cited

FOREIGN PATENT DOCUMENTS

| | | | | |
|---|---|---|---|---|
| JP | 61139221 | A | 6/1986 | |
| JP | 61161827 | U | 10/1986 | |
| JP | 1990055506 | A | 2/1990 | |
| JP | 2-108007 | | 4/1990 | ............... G02B 6/28 |
| JP | 2108007 | A | 4/1990 | |
| JP | 02108007 | A * | 4/1990 | |
| JP | 2108008 | A | 4/1990 | |
| JP | 02108008 | A * | 4/1990 | |
| JP | 6017157 | U | 3/1994 | |
| JP | 9178956 | A | 7/1997 | |
| JP | 9237524 | A | 9/1997 | |
| JP | EP 1221628 | A2 * | 7/2002 | ............... B60Q 1/26 |
| KR | 875507 | B1 | 12/2008 | |
| WO | 0011484 | A1 | 3/2000 | |
| WO | 2005/106/899 | A1 | 10/2005 | ............... H01B 7/36 |
| WO | 2005106899 | A1 | 11/2005 | |
| WO | WO 2005106899 | A1 * | 11/2005 | |
| WO | 2006044177 | A2 | 4/2006 | |
| WO | 2006113114 | A2 | 10/2006 | |
| WO | 2008048955 | A2 | 4/2008 | |
| WO | 2013122825 | A1 | 8/2013 | |
| WO | 2014026300 | A1 | 2/2014 | |
| WO | 2015000194 | A1 | 1/2015 | |

OTHER PUBLICATIONS http://www.dexim.net/list.php?id=7, Dexim product reference, downloaded from the web Feb. 24, 2016. 2 pages.
Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
Schott, "SpectraStream Glass Harnesses," Rev. Nov. 2006, 2 pages.
Spigulis, J., "Side-Emitting Fibers Brighten Our World in New Ways," Oct. 2005, Retrieved from www.osa-opn.org, 6 pages.
Patent Cooperation Treaty, International Search Report, Application No. PCT/US2013/025262, Jul. 16, 2013, 7 pages.
"Super Vision Fiber Optics Side Glow Cables, " TriN01ihLighting.com, Tri North Lighting, Inc., n.d., Web. Aug. 1, 2013.
U.S. Appl. No. 13/431,565, filed Mar. 27, 2012, David L. Dean, Jr., 32 pages.
European Search Report, Application No. 15168466.9-1553, Dec. 17, 2015, 9 pages.
Optical fiber with nanostructured cladding ofTi02 nanoparticles self-assembled onto a side polished fiber and its temperature sensing, Lu et al., Optics Express, vol. 22, No. 26, Dec. 29, 2014, 7 pages, downloaded from internet on Jan. 5, 2015.
Patent Cooperation Treaty, International Search Report for PCT/US2015/060558, dated Feb. 9, 2016, 5 pages.
Patent Cooperation Treaty International Search Report, Application No. PCT/US2014/049524, Jan. 20, 2015, 5 pages.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Patent Cooperation Treaty, International Search Report, PCT/US2014/049525, Mail date Jan. 23, 2015, 18 pages.
U.S. Appl. No. 14/295,844, Bookbinder filed on Jun. 4, 2014, 25 pages.
Patent Cooperation Treaty, International Search Report and Written Opinion for International Application No. PCT/US2014/041510, Mailing Date Sep. 18, 2014, 10 pages.

* cited by examiner

OPTICAL FIBER CABLE ASSEMBLY COMPRISING OPTICAL TRACER FIBER

RELATED APPLICATIONS

This application claims the benefit of priority under 35 U.S.C. §119 of U.S. Provisional Application Ser. No. 61/864,778 filed on Aug. 12, 2013, the content of which is relied upon and incorporated herein by reference in its entirety.

BACKGROUND

The present disclosure relates to optical fiber cable assemblies and, more particularly, to visually traceable optical fiber cable assemblies.

Typically, optical fibers that are utilized in optical fiber cable assemblies are color-coded prior to field deployment to allow for identification of particular fibers along their respective lengths. However, the present inventors have recognized that multiple cables are often deployed densely enough to make tracing individual cables nearly impossible, particularly in the context of optical fiber jumpers utilized in data centers, where relatively long jumpers connected to and between data center racks must be clearly identifiable. Additionally, as optical fiber technology penetrates consumer electronics, cables for different peripherals will become identical and be harder to trace, introducing further challenges into the installation and maintenance of home entertainment and computing systems. The present inventors have also recognized that electrical and opto-electrical cable assemblies face similar design challenges.

SUMMARY

The subject matter of the present disclosure provides a means by which an optical fiber cable path can be fully or partially illuminated for convenient identification or to trigger a maintenance event and has applicability to a variety of applications that utilize optical fiber cable assemblies including, but not limited to, high speed data networks and consumer electronics. Although the subject matter of the present disclosure is described primarily in the context of optical fiber cable assemblies, the concepts presented herein can also be applied to a variety of conduit applications including, for example, plumbing conduits, or other non-electrical and non-optical conduits.

Fiber optic cable assemblies may range in size and complexity from single-fiber jumpers to multi-fiber harnesses. These cable assemblies are often used to interconnect equipment in high-speed networks. A common problem in these networks is congestion and clutter caused by large quantities of the cables. FIG. 1 shows an example of congestion in an equipment rack 110. FIG. 2 shows congestion in an under-floor cable tray 210. The equipment rack 110 and the under-floor cable tray 210 include large numbers of fiber optic cables 112, 212, which may be legs of larger cable assemblies, such as harness cable assemblies or jumper cables extending from a trunk cable by way of a furcation body. As shown in FIGS. 1-2, the fiber optic cables 112, 212 of the assemblies have connectors 114, 214 on ends of the fiber optic cables 112, 212, and the connectors 114, 214 may be attached to hardware, such as servers 116 in the rack 110 (FIG. 1), to other cables, or elsewhere. As discussed in the Background section, identifying individual fiber optic cables 112, 212 in the equipment rack 110 or the under-floor cable tray 210 may be difficult for a network operator during moves, adds, and changes in the network. Network operators frequently desire to change optical connections to accommodate moves, adds, and changes in the network. However, such congestion makes it difficult to trace a particular assembly from the source to the receiver, which may be required to perform the moves, adds, and changes in the network. Other types of cables may have similar problems.

In accordance with one embodiment of the present disclosure, an optical fiber cable assembly is provided comprising at least one optical tracer fiber, one or more optical data transmission fibers, and a cable jacket. The optical data transmission fibers are surrounded by the cable jacket and define a data transmission profile comprising a relatively low scattering loss of <10 dB/km at a data transmission wavelength or wavelength range $\lambda_D$ that lies in an IR portion of the optical spectrum. The optical tracer fiber defines a tracer scattering profile comprising a relatively high scattering loss of >15 dB/km at a tracer wavelength or wavelength range $\lambda_T$ that lies in a visible portion of the optical spectrum such that visible light at a tracer wavelength between about 400 nm and about 700 nm or a tracer wavelength range $\lambda_T$ between about 400 nm and about 700 nm is dispersed from the optical tracer fiber along at least a portion of its length. The optical tracer fiber is wound about a longitudinal axis of the optical fiber cable assembly and is either physically coupled to the cable jacket or contained within an inside diameter of the cable jacket. The optical fiber cable assembly is configured such that the dispersed visible light at the tracer wavelength or wavelength range $\lambda_T$ or an optically visible shifted tracer wavelength or wavelength range $\lambda_T^*$ is visible from an exterior of the optical fiber cable assembly.

In accordance with another embodiment of the present disclosure, an optical fiber cable assembly is provided wherein the cable jacket is engineered to generate light at an optically visible shifted tracer wavelength or wavelength range $\lambda_T^*$ from visible light at the tracer wavelength or wavelength range $\lambda_T$.

In accordance with yet another embodiment of the present disclosure, it is contemplated that the optical tracer fiber may define a tracer scattering profile that comprises a relatively high scattering loss at a non-visible tracer wavelength or tracer wavelength range $\lambda_T$ that lies in a non-visible portion of the optical spectrum such that non-visible light at the tracer wavelength or wavelength range $\lambda_T$ is dispersed from the optical tracer fiber along at least a portion of its length. In addition, the optical fiber cable assembly can be configured such that the dispersed light at the tracer wavelength or wavelength range $\lambda_T$ or a shifted tracer wavelength or wavelength range $\lambda_T^*$ is detectable from an exterior of the optical fiber cable assembly.

In accordance with yet another embodiment of the present disclosure, an optical fiber cable assembly is provided wherein the cable jacket comprises an optically reflective material and the optical tracer fiber is partially embedded in the cable jacket or secured to an outer periphery of the cable jacket such that a portion of the dispersed visible light from the optical tracer is reflected by the optically reflective material of the cable jacket to exit the optical fiber cable assembly. Additional embodiments are disclosed and claimed.

Although the concepts of the present disclosure are described herein with primary reference to just a few different types of optical fiber cable assemblies, it is contemplated that the concepts will enjoy applicability to any optical fiber cable assembly or conduit application, regardless of the type of fibers, cabling media, or cable jackets utilized therein. Further, additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments and together with the description serve to explain principles and operation of the various embodiments.

DETAILED DESCRIPTION

Figure 3:
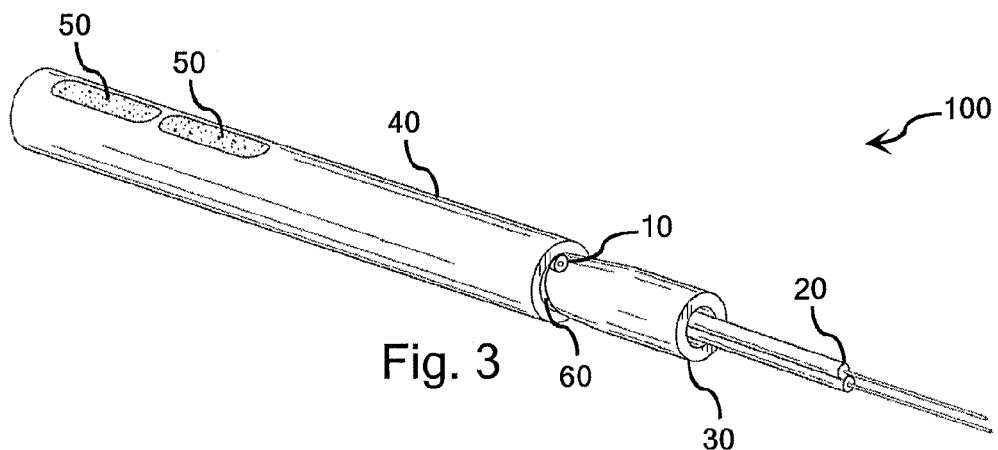
FIG. 3 illustrates an optical fiber cable assembly comprising an optical tracer fiber according to one embodiment of the present disclosure.
Figure 4:
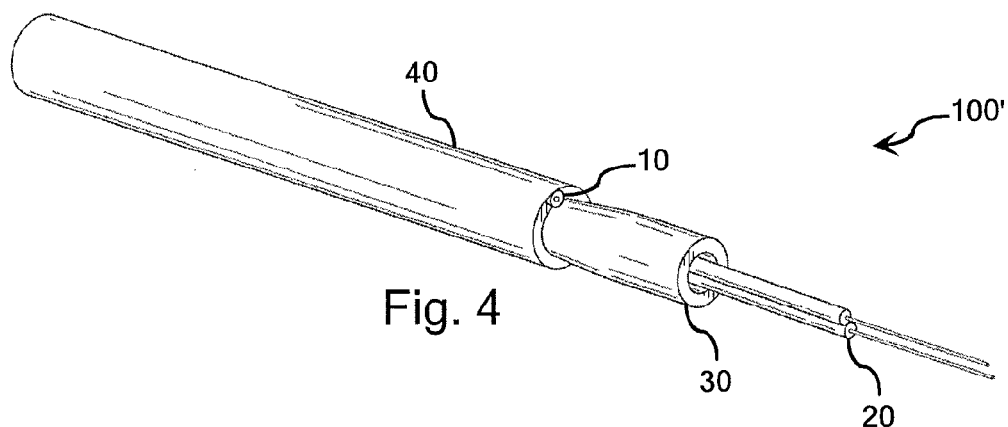
FIG. 4 illustrates an optical fiber cable assembly comprising an optical tracer fiber according to another embodiment of the present disclosure.
Figure 5:
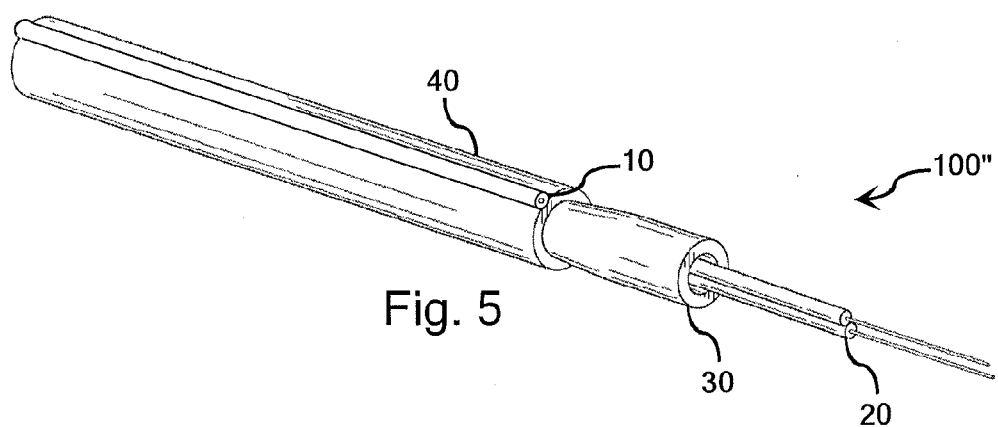
FIG. 5 illustrates an optical fiber cable assembly comprising an optical tracer fiber according to yet another embodiment of the present disclosure.

FIGS. 3-5 illustrate optical fiber cable assemblies 100, 100', 100" that comprise an optical tracer fiber 10, one or more optical data transmission fibers 20, cabling media 30, and a cable jacket 40. Although, as is described in detail below, these cable components may take a variety of conventional and yet-to-be developed forms, the concepts of the present disclosure are illustrated herein with reference to relatively simple cable configurations to preserve clarity. One skilled in the art of optical fiber cables will appreciate that a variety of component designs may be utilized to construct an optical fiber cable assembly including, for example, a variety of different types, numbers and configurations of single mode and multi-mode data transmission fibers. Cable assemblies according to the present disclosure may also utilize a variety of different types of cabling media and cable jackets, examples of which are presented in more detail below.

The optical data transmission fibers 20 are surrounded by the cable jacket 40 and define a data transmission profile that comprises a relatively low scattering loss (in some embodiments <10 dB/km, in some embodiments <3 dB/km, in some embodiments <1 dB/km and in some embodiments <0.5 dB/km) at a data transmission wavelength or wavelength range $\lambda_D$, which typically lies in an IR portion of the optical spectrum (i.e., at one or more transmission wavelengths greater than 700 nm, in some embodiments at one or more transmission wavelengths from about 700 to about 1700 nm, in some embodiments at one or more transmission wavelengths about 850 to about 1650 nm). In contrast, the optical tracer fiber 10 is physically coupled to, or surrounded by, the cable jacket 40 and defines a tracer scattering profile that comprises a relatively high scattering loss (in some embodiments >15 dB/km, in some embodiments >20 dB/km, in some embodiments >40 dB/km and in some embodiments >60 dB/km) at a tracer wavelength or wavelength range $\lambda_T$, which lies in a visible portion of the optical spectrum (e.g., at one or more wavelengths between about 400 nm and about 700 nm), such that visible light at one or more tracer wavelengths between about 400 nm and about 700 nm, or at one or more tracer wavelength ranges $\lambda_T$ between about 400 nm and about 700 nm, is dispersed from the optical tracer fiber 10 along at least a portion of its length. It is noted that reference herein to "relatively" low and high scattering losses should be taken as a definite reference to specific portions of the data transmission profile of the particular fiber at issue, i.e., those portions of the profile where scattering losses are low or high compared to other portions of the profile.

The optical data transmission fibers 20 contemplated herein are designed for efficient data transmission at a given data transmission wavelength or wavelength range $\lambda_D$. Although the given data transmission wavelength or wavelength range $\lambda_D$ may be in a visible or infrared (IR) portion of the optical spectrum, in some embodiments, the data transmission wavelength or wavelength range $\lambda_D$ falls in a IR portion of the optical spectrum, e.g., a portion of the IR spectrum longer than about 700-800 nm.

In the optical fiber cable assembly 100 illustrated in FIG. 3, the optical tracer fiber 10 is positioned within an inside diameter of the cable jacket 40 and the cable jacket 40, which is visible from an exterior of the optical fiber cable assembly 100, is translucent or transparent to the tracer wavelength or wavelength range $\lambda_T$, or an optically visible shifted tracer wavelength or wavelength range $\lambda_T^*$, along at least a portion of a length of the optical fiber cable assembly 100. It is contemplated that the cable jacket 40 may comprise a fluorescent component that generates the optically visible shifted tracer wavelength or wavelength range $\lambda_T^*$ upon propagation of the tracer wavelength or wavelength range $\lambda_T$ from the optical tracer fiber 10 through the cable jacket 40. It is also contemplated that the tracer wavelength or wavelength range $\lambda_T$ and the shifted tracer wavelength or wavelength range $\lambda_T^*$ may lie in the blue, green or red portion of the optical spectrum.

In one embodiment of the present disclosure, the optical fiber cable assembly 100, 100', 100" is engineered such that the tracer wavelength or wavelength range $\lambda_T$ lies in the blue portion of the optical spectrum and the cable jacket 40, cabling media 30 disposed within the cable jacket 40, or both, are configured to impart a blue-to-green shift in visible light scattered from the optical tracer fiber 10. The resulting visible signal is very effectively and efficiently produced because Rayleigh scattering in blue is very efficient so the optical tracer fiber 10 can be configured to emit vibrant blue light throughout its length. This vibrant blue light is preferably then converted to green because the human eye is about 20 times more sensitive to green light than blue. Alternatively, it is contemplated that the aforementioned conversion can be from the invisible, blue, or green portion of the optical spectrum to the red portion of the optical spectrum.

In the aforementioned optical shift embodiments, it will be particularly advantageous to ensure that the optical tracer fiber is embedded in the cable jacket or contained within an inside diameter of the cable jacket such that the dispersed visible light from the optical tracer fiber must pass through the cable jacket before exiting the optical fiber cable assembly.

Regardless of whether the cable jacket 40 is provided with a fluorescent or some other type of transmissive component, in embodiments where the optical tracer fiber is partially embedded in the cable jacket or secured to an outer periphery of the cable jacket it may also be particularly advantageous to provide the cable jacket with an optically reflective material. In this manner, emission efficiency of the optical tracer fiber will be enhanced because a portion of the dispersed visible light from the optical tracer fiber will be reflected by the optically reflective material of the cable jacket and will exit the optical fiber cable assembly. It is contemplated that the optically reflective material may comprise, for example, white paint comprising a reflective material such as TiO2 or Al2O3, or any of a variety of conventional or yet-to-be reflective materials suitable for inclusion in or on a cable jacket.

It is contemplated that visibility can also be enhanced by pulsing the tracer wavelength or wavelength range $\lambda_T$, preferably at a frequency of less than approximately 40 Hz. Additionally, it is contemplated that zero-bend, patterned tracer emission may be enabled by configuring the tracer scattering profile of the optical tracer fiber 100, 100', 100" and the optical intensity of the optical tracer source such that visible light at the tracer wavelength or wavelength range $\lambda_T$ is dispersed from zero-bend portions of the optical tracer fiber at a luminance that is at least about 80 cd/m$^2$. In this manner, the optical fiber cable assembly can be configured such that the dispersed visible light $\lambda_T$, $\lambda_T^*$ is visible from an exterior of the optical fiber cable assembly as a color-coded, patterned, or symbolic emission.

It is also contemplated that the cable jacket 40 may be otherwise compositionally or structurally varied continuously or discontinuously along its length to permit the dispersed visible light at the tracer wavelength or wavelength range $\lambda_T$ or the shifted tracer wavelength or wavelength range $\lambda_T^*$ to be visible from an exterior of the optical fiber cable assembly. For example, in one embodiment, the cable jacket 40 is provided with transmissive (e.g., fluorescent), translucent, or transparent regions 50 that are configured to permit the propagation or transmission of the tracer wavelength or wavelength range $\lambda_T$ or the optically visible shifted tracer wavelength or wavelength range $\lambda_T^*$ to the exterior of the cable jacket 40. These transparent regions 50 may be provided as transmissive, translucent, or transparent voids or plugs in the cable jacket 40 or may be provided as a substantially continuous strip along the cable jacket 40. It is also contemplated that some optical fiber cable assemblies will utilize hygroscopic tape, or hygroscopic powder, or some other structure that is interposed between the optical tracer fiber 10 and the cable jacket 40. In which case, it will be advantageous to ensure that the hygroscopic material or other interposing structure is also provided with transmissive, translucent, or transparent regions that permit propagation of the tracer wavelength or wavelength range $\lambda_T$ or the optically visible shifted tracer wavelength or wavelength range $\lambda_T^*$.

In the embodiment illustrated in FIG. 4, the optical tracer fiber 10 is positioned between an inside diameter of the cable jacket 40 and an outside diameter of the cable jacket 40, i.e., within the body of the cable jacket 40. The cable jacket 40, which is visible from an exterior of the optical fiber cable assembly 100', is again configured to be translucent or transparent to the tracer wavelength or wavelength range $\lambda_T$ or the optically visible shifted tracer wavelength or wavelength range $\lambda_T^*$ along at least a portion of a length of the optical fiber cable assembly 100'. It is contemplated that the embodiment illustrated in FIG. 4 may also take advantage of fluorescence in the cable jacket 40, i.e., by configuring the composition of the cable jacket 40 so that it transmits the optically visible shifted tracer wavelength or wavelength range $\lambda_T^*$ along at least a portion of a length of the optical fiber cable assembly 100'.

In the embodiment illustrated in FIG. 5, the optical tracer fiber 10 is positioned on an outside diameter of the cable jacket 40, or at least partially extends beyond an outside diameter of the cable jacket 40. In this manner, the visible tracer wavelength or wavelength range $\lambda_T$ or the optically visible shifted tracer wavelength or wavelength range $\lambda_T^*$ can both be readily viewed when the light is scattered and dispersed from the optical tracer fiber 10. In some embodiments, the optical tracer fiber 10 will comprise a tracer jacket, which will also need to be made transmissive of, or translucent or transparent to, the visible tracer wavelength or wavelength range $\lambda_T$ or the optically visible shifted tracer wavelength or wavelength range $\lambda_T^*$.

In each of the above-described embodiments, it is noted that dispersed light at the tracer wavelength or wavelength range $\lambda_T$ or an optically shifted tracer wavelength or wavelength range $\lambda_T^*$ typically falls in the visible portion of the optical spectrum but it is contemplated that tracer wavelength or wavelength range $\lambda_T$ may fall in an IR or other non-visible portion of the optical spectrum. In which case, suitable monitoring equipment sensitive to the IR light can be provided to detect the tracer light. It is contemplated that a variety of tracer fiber configurations will be suitable for use as the tracer fibers 10 described and claimed herein—including conventional optical fibers and as yet undeveloped optical fibers. For example, it is contemplated that the optical tracer fiber 10 may comprise a coated or uncoated optical fiber, which may or may not include an exterior buffer tube or exterior buffer coating. Suitable tracer fibers include, but are not limited to, the fiber configurations disclosed in US PG Pub. No. 2011/0122646 ("Optical Fiber Illumination Systems and Methods).

Figure 6:
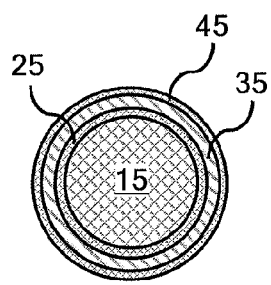
FIG. 6 illustrates some contemplated tracer fiber configurations according to the present disclosure.

Referring to FIG. 6, contemplated tracer fiber configurations may comprise a silica-based glass core 15, which may or may not comprise random or non-periodic fiber core airlines, a primary cladding layer 25 surrounding the core 15, a secondary cladding or coating 35 surrounding the primary cladding layer 25, and a scattering layer 45 surrounding the secondary cladding or coating 35. The primary cladding layer 25 may comprise silicon, a fluoroacrylate polymer, or F-doped glass, each with a refractive index n lower than that of the silica forming the glass core 15. In cases where the primary cladding layer 25 comprises F-doped glass, it is contemplated that conventional telecom fiber comprising an acrylate primary cladding layer 25 may be utilized. The secondary cladding or coating 35 may also be provided in the form of an acrylate polymer, which is also typical for conventional telecom fiber. Contemplated alternative embodiments utilize the core 15 with airlines and the secondary cladding 35 only, eliminating the primary cladding layer 25. The scattering layer 45 may be provided as an acrylate polymer and may include white ink, a flame retardant composition, etc.

Embodiments contemplated herein include, but are not limited to, silica ($SiO_2$) glass-based optical tracer fibers. Regardless of the particular type of optical tracer fiber 10 that is utilized in accordance with the concepts of the present disclosure, it is noted that the optical tracer fiber 10 may comprise continuous or discontinuous optical scattering sites along its length. These scattering sites can be configured to impart high bulk Rayleigh scattering at the tracer wavelength or wavelength range $\lambda_T$ (relative to a degree of Rayleigh scattering at the data transmission wavelength or wavelength range $\lambda_D$). These optical scattering sites may comprise, for example, random or non-periodic fiber core voids (often referred to as "airlines") or a raised index compound, relative to the core, at an outer radius of the optical tracer fiber (e.g., by doping with a $GeO_2$, $TiO_2$, or $Al_2O_3$ updopant). In cases where the cladding includes voids, as is disclosed in U.S. Pat. No. 8,385,701 ("Low Bend Loss Optical Fiber," issued to Corning Incorporated), the voids in some embodiments may be non-periodically located within a depressed-index annular portion of a central glass core region of the fiber. By "non-periodically located", we mean that when one takes a cross section (such as a cross section perpendicular to the longitudinal axis) of the optical fiber, the non-periodically disposed voids are randomly or non-periodically distributed across a portion of the fiber (e.g. within the depressed-index annular region). Similar cross sections taken at different points along the length of the fiber will reveal different randomly distributed cross-sectional hole patterns, i.e., various cross sections will have different hole patterns, wherein the distributions of voids and sizes of voids do not exactly match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. It is believed that the voids extend along the length of the fiber a distance less than 20 meters, more preferably less than 10 meters, even more preferably less than 5 meters, and in some embodiments less than 1 meter. Optical fiber disclosed herein can be made by methods which utilize preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

Figure 7:
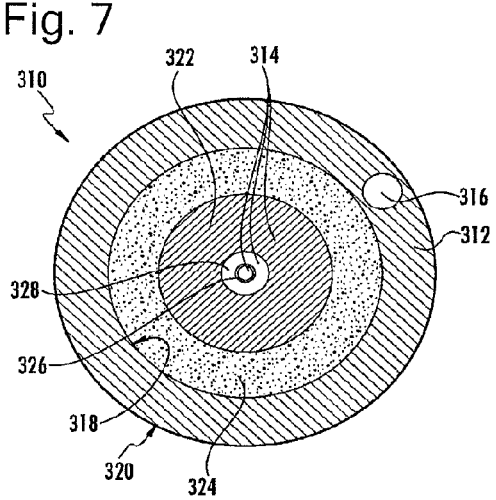
FIGS. 7-14 are sectional end views of fiber optic cable assemblies according to various alternative embodiments of the present disclosure.

FIGS. 7-14 are sectional end views of fiber optic cable assemblies according to various alternative embodiments of the present disclosure. Referring to FIG. 7, a cable (e.g., wire, rope, line, conduit), such as a fiber optic cable 310, includes a jacket 312, a transmission element in the form of a first optical fiber 314, and a tracer feature in the form of a second optical fiber 316. The jacket 312 has an interior surface 318 that defines a conduit (e.g., annular passage) and an exterior surface 320 (e.g., outside, outer portion). According to one embodiment, the first optical fiber 314 is a glass optical fiber, including a glass core 326 and cladding 328 (e.g., ClearCurve® single or multi-mode fibers produced by Corning Incorporated, or other commercially-available optical fibers). The core is configured to serve as a medium for controlled transmission of light through the fiber optic cable 310, such as for high-speed data communication within a network.

In some embodiments, the first optical fiber 314 is a tight-buffered optical fiber having a protective layer 322 (e.g., polymer layer) surrounding the glass core 326 and cladding 328. In other embodiments, the first optical fiber 314 may be one of a plurality of glass optical fibers in a loose-tube arrangement (see generally FIG. 13). In still other embodiments, the first optical fiber 314 may be one of several glass optical fibers arranged in parallel with one another in a ribbon of such fibers. A layer of strength elements 324 (e.g., aramid), rip cords, armor, water-swellable powder, and/or other features may be included within the conduit formed by the interior surface 318 of the jacket 312 or otherwise integrated with the cable 310. In contemplated embodiments, a cable as disclosed herein may contain transmission media other than optical fibers, such as copper wires, fluid, or other media.

According to one embodiment, the tracer feature, in the form of the second optical fiber 316 of the fiber optic cable 310, is integrated with (e.g., fully or partially embedded in or mounted, attached, coupled, or otherwise secured to) the jacket 312. More specifically, in some embodiments, the second optical fiber 316 is integrated with the exterior surface 320 of the jacket 312 such that light released laterally by the second optical fiber 316 may be visible from outside of the jacket 312, such as to the operator of the cable network for tracing of the individual optical cable 310. The amount of light released by the second optical fiber 316 is a function of the amount of light directed into the second optical fiber, the distance from the source of light, the wavelength of the light, the source of the light (e.g., laser versus LED), the materials and structure of the second optical fiber 316, and other factors. Less ambient light and a shorter cable length may improve performance of the tracer feature.

Referring specifically to FIG. 7, the second optical fiber 316 is embedded in the exterior surface 320 of the jacket 312, where only a thin portion of the jacket 312 (e.g., less than 1 mm, less than 100 µm) is positioned between the second optical fiber 316 and outside of the jacket 312. Attenuation of light from a laser or another external light source directed into the second optical fiber 316 illuminates the cable 310, causing the jacket 312 to glow from the release of light from the second optical fiber 316 through the thin portion of the jacket 312. In some embodiments, the second optical fiber 316 may be a relatively high-loss fiber, attenuating the quantity of visible light passing there through by more than half in a distance that is less than 20,000 times the diameter of the fiber (i.e., core, cladding, and outer coating if glass; e.g., 250 µm diameter).

Figure 1:
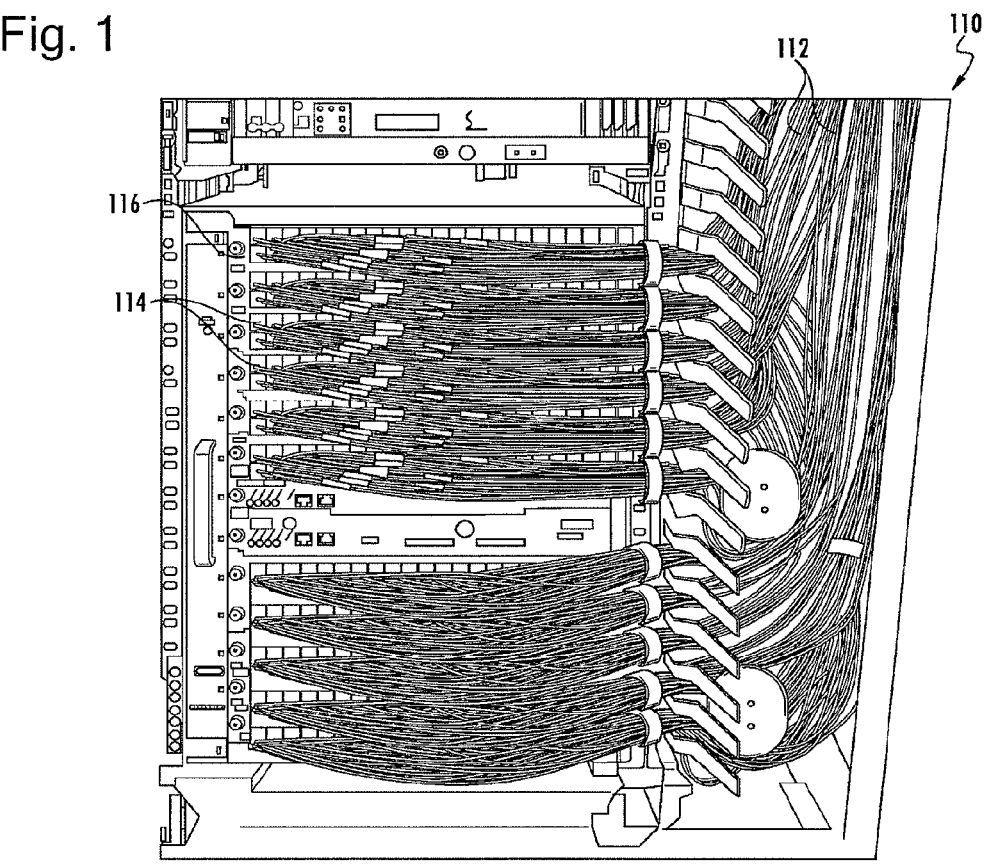
FIG. 1 illustrates an equipment rack supporting fiber optic cables.
Figure 2:
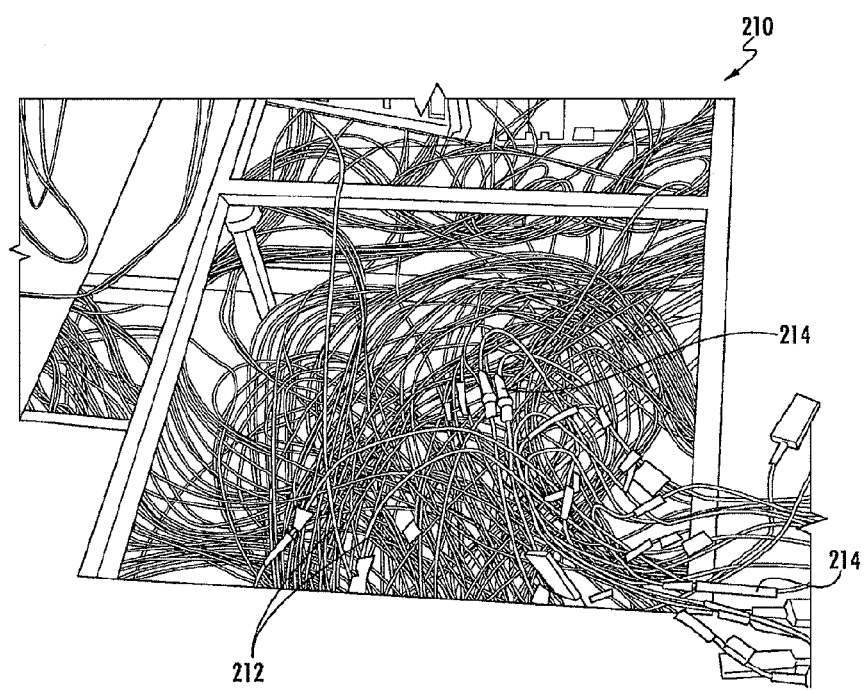
FIG. 2 illustrates an under-floor cable tray supporting fiber optic cables.

In other embodiments, the second optical fiber 316 is configured to transmit visible light from one end of the cable 310 to the other in order to identify which connectors (e.g., multifiber push-on/pull-off connectors, local connector (LC) connectors, etc.) are attached to the same cable 310, without releasing a substantial amount light (e.g., generally not detectable by a human-eye) along the length of the cable 310. In still other embodiments, some light is released by the second optical fiber 316 to provide a visible, longitudinal trace for the cable 310, while other light carried by the second optical fiber 316 is communicated completely through the second optical fiber 316 between ends of the cable 310 to identify connectors (see, e.g., connectors 114, 214 as shown in FIGS. 1-2) common to the cable 310.

In some embodiments, the cable 310 may be manufactured by a process including extruding the jacket 312 around a transmission element (e.g., first optical fiber 314, copper wire) and integrating the second optical fiber 316 with the exterior surface 320 of the jacket 312. The jacket 312 may be extruded fully or only partially around the second optical fiber 316.

According to a preferred embodiment, the jacket 312 and the second optical fiber 316 are co-extruded. Co-extrusion of different materials in a cable jacket, forming particular shapes of the secondary material within the wall of the jacket, and other relevant teachings are provided by International Application Nos. PCT/US11/62002 filed Nov. 23, 2011, PCT/US11/57574 filed Oct. 25, 2011, and PCT/US11/34309 filed Apr. 28, 2011. Accordingly, the second optical fiber 316 may have a circular cross-section that is co-extruded at least partially into an annular wall of the jacket 312, as shown in FIG. 3.

In some embodiments, the second optical fiber 316 is embedded in the jacket 312, and the jacket 312 serves as cladding for a core formed by the material of the second optical fiber 316, thereby forming a step-index optical fiber. In other embodiments, the second optical fiber 316 includes two different materials and/or different arrangements of the same material that form a core surrounded by cladding, which is at least partially embedded in the jacket 312 (i.e., yet another material). Such a two-layered, optical fiber may be co-extruded with the jacket 312, or separately formed and otherwise coupled to the jacket 312.

In some contemplated embodiments, the second optical fiber 316, integrated with the exterior surface 320 of the jacket 312, may be a glass optical fiber. In some such embodiments, the glass optical fiber may be configured or arranged to release a relatively large amount of light along the length of the glass optical fiber, such that the light is visible along the length of the jacket 312 to provide a visible trace for the cable 310. The glass of the second optical fiber 316 may include random air voids, impurities, micro-cracks, air pockets, etc. to increase attenuation of the second optical fiber 316, such as by scattering light carried by the second optical fiber 316. A lower grade glass core material may be used. The glass of the second optical fiber 316 may have imperfections in the cladding, such as holes, scratches, etc. The cladding material may be selected to allow for a controlled amount of light released from the core. The glass of the second optical fiber 316 may be crimped or otherwise bent to increase attenuation. In some embodiments, the second optical fiber 316 has at least twice the attenuation of visible light than the first optical fiber 314.

In some embodiments, the second optical fiber 316 may be drawn from a payoff along a path that is exterior to the extruder, and then pressed into the jacket 312 before the jacket fully hardens (i.e., cools) from the extrusion process. In still other embodiments, the second optical fiber 316 may be glued, taped, or otherwise secured to the jacket 312.

Referring generally to FIGS. 8-14, various forms of cables, shown as cables 410, 510, 610, 710, 810, 910, 1010, 1110, 1210, 1310, 1410, 1510, 1610, each include a jacket 412, 512, 612, 712, 812, 912, 1012, 1112, 1212, 1312, 1412, 1512, 1612, a first optical fiber 414, 514, 614, 714, 814, 914, 1014, 1114, 1514, 1614, and a second optical fiber 416, 516, 616, 716, 816, 916, 1016, 1116, 1216, 1316, 1416, 1516, 1616. According to some embodiments, the first optical fiber 414, 514, 614, 714, 814, 914, 1014, 1114, 1514, 1614 includes a glass core and cladding (see, e.g., glass core 326 and cladding 328 as shown in FIG. 7), where the glass core is configured to provide controlled transmission of light through the respective fiber optic cable 410, 510, 610, 710, 810, 910, 1010, 1110, 1210, 1310, 1410, 1510, 1610 for high-speed data communication. The jacket 412, 512, 612, 712, 812, 912, 1012, 1112, 1212, 1312, 1412, 1512, 1612 has an interior surface 418, 518, 618, 718, 818, 918, 1018, 1118, 1518, 1618 that defines a conduit through which the first optical fiber 414, 514, 614, 714, 814, 914, 1014, 1114, 1514, 1614 extends, and further has an exterior surface 420, 520, 620, 720, 820, 920, 1020, 1120, 1220, 1320, 1420, 1520, 1620 that defines the outside of the respective fiber optic cable 410, 510, 610, 710, 810, 910, 1010, 1110, 1210, 1310, 1410, 1510, 1610. The second optical fiber 416, 516, 616, 716, 816, 916, 1016, 1116, 1216, 1316, 1416, 1516, 1616 is integrated with the exterior surface 420, 520, 620, 720, 820, 920, 1020, 1120, 1220, 1320, 1420, 1520, 1620 of the respective jacket 412, 512, 612, 712, 812, 912, 1012, 1112, 1212, 1312, 1412, 1512, 1612, as shown in FIGS. 8-14.

Figure 8:
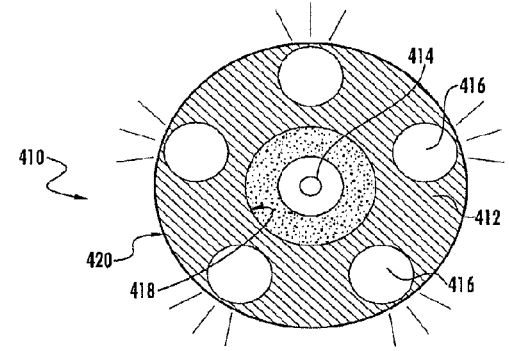

Referring more specifically to FIG. 8, the fiber optic cable 410 includes a plurality of optical fibers 416 at least partially embedded in the jacket 412. In some embodiments, the optical fibers 416 are uniformly distributed radially around the jacket 412, such as three or more optical fibers 416 that also extend longitudinally along the length of the jacket 412. Use of three or more evenly spaced optical fibers 416 that are at least partially embedded in the jacket 412 is intended to ensure that at least one of the optical fibers 416 is in a relatively good visible position when viewing the cable in any orientation, such as when all of the plurality of optical fibers 416 are releasing light that is visible longitudinally along the length of the jacket 412.

Figure 9:
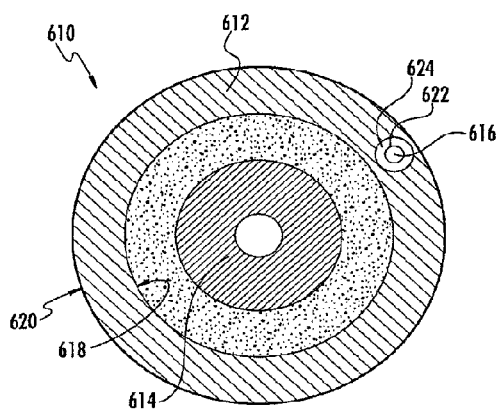

Referring to FIG. 9, the fiber optic cable 510 includes two sub-units 522, 524 connected by a central webbing 526 of the jacket 512. Each of the sub-units 522, 524 includes a portion of the jacket 512 and contains the first optical fibers 514, which may be a glass optical fiber configured for high-speed data transmission. According to one embodiment, the second optical fiber 516 of the fiber optic cable 510 is embedded in the webbing connecting the sub-units. In some such embodiments, the second optical fiber 516 is visible from either side of the webbing 526 (e.g., top or bottom) when releasing light to serve as a visual trace of the cable 510. Locating the second optical fiber 516 in the webbing 526 portion of the jacket 512 allows for the same optical fiber 516 to provide a visual trace on both sides of the cable 510. In other embodiments, other or additional optical fibers 516 are embedded elsewhere in the jacket 512, similar to the embodiments shown in FIGS. 7-8 and 10-14.

Figure 10:
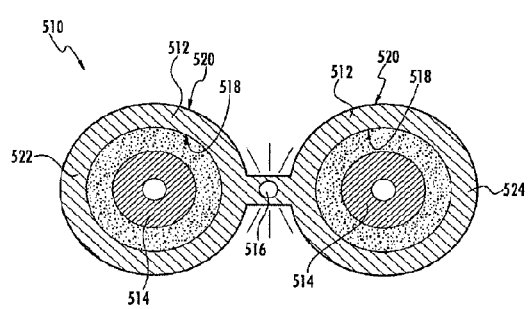

Referring to FIG. 10, the fiber optic cable 610 includes the second optical fiber 616, which has both a core 622 and a cladding 624. In some embodiments, the second optical fiber 616 is a glass optical fiber that is drawn through the extruder and embedded in the jacket 612 during manufacturing of the cable 610. In other embodiments, the second optical fiber 616 is an optical fiber that is co-extruded with the jacket 612, or is otherwise coupled to the jacket 612. In some embodiments, the second optical fiber 616 is configured to communicate visible light from one end of the cable 610 to the other in order to indicate which cable ends are part of the same cable 610. In some embodiments, the second optical fiber 616 is otherwise or further configured to release visible light along the length of the cable 610, such as from the core 622 laterally outward, through or past the cladding 624.

Figure 11:
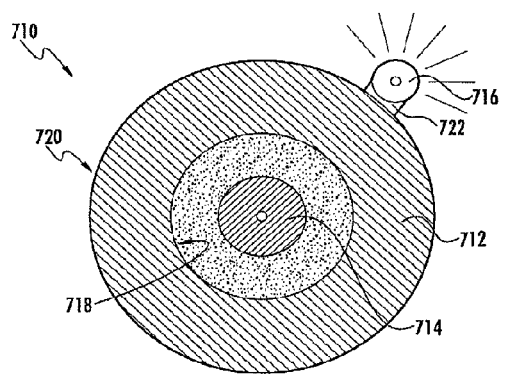

Referring to FIG. 11, the fiber optic cable 710 includes the second optical fiber 716 fastened to the exterior surface 720 of the cable 710. In some embodiments, an adhesive 722 is used to glue the second optical fiber 716 to the exterior surface 720. In other embodiments, the tape, clips, or other fasteners are used. In some embodiments, a combination of fasteners are used, such as glue between the second optical fiber 716 and the exterior surface 720 of the jacket 712, and clear tape over the top of the second optical fiber 716 to further secure the second optical fiber 716 to the exterior surface 720 of the jacket 712 of the fiber optic cable 710. The second optical fiber 716 may be fastened to the exterior surface of the cable as part of an assembly line that includes an extruder for forming the jacket. In other embodiments, the second optical fiber may be fastened to the exterior surface of a section (e.g., 10-meter section) of cable cut from a larger cable (e.g., hundreds of meters on a reel), where the section is being prepared as a specialized cable for a data center, such as a jumper cable.

Figure 12:
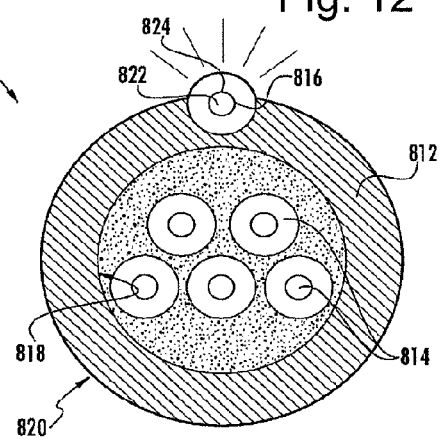

Referring to FIG. 12, the fiber optic cable 810 includes the second optical fiber 816 partially embedded in the exterior surface 820 of the jacket 812. At least a portion of the second optical fiber 816 is directly exposed to outside of the fiber optic cable 810 (e.g., exposed to atmosphere, along outermost periphery of the cable 810). In some such embodiments, the second optical fiber 816 is co-extruded with the material of the jacket 812, and includes a core 822 and cladding 824. In other such embodiments, the second optical fiber 816 is drawn from a payoff and is pressed into the exterior surface 820 of the jacket 812. The second optical fiber 816 may include a coating to improve adhesion to the jacket. According to one embodiment, the second optical fiber is extruded such that the second optical fiber 816 is produced as a bump or raised section on the jacket 812, which may increase the visibility of the tracer feature.

Figure 13:
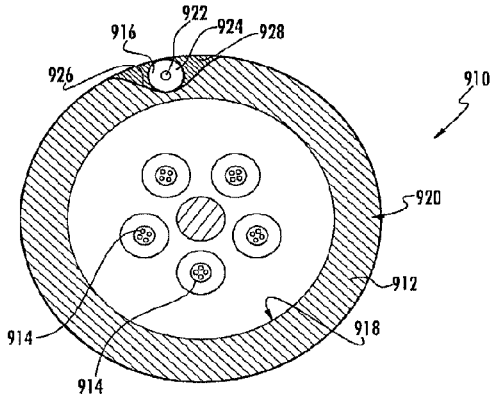

Referring to FIG. 13, the fiber optic cable 910 includes the second optical fiber 916 integrated with the exterior surface 920 of the jacket 912. According to one embodiment, the second optical fiber 916 includes a core 922 and cladding 924, and is configured to release light directed through the core 922 laterally along the length of the second optical fiber 916. The second optical fiber 916 is located in a notch 926 (e.g., well, channel, groove) in the exterior surface 920, and is secured therein with a translucent (e.g., clear, semiclear) material 928 (e.g., thermoplastic). Use of the translucent material 928 allows light released from the second optical fiber 916 to provide a visible trace for the cable 910, while maintaining a round exterior shape of the cable 910 and providing some wear-resistant shielding to the second optical fiber 916.

In some embodiments, the core 922, the cladding 924, the translucent material 928, and the jacket 912 are co-extruded around the first optical fibers 914 and other components of the fiber optic cable 910. In other embodiments, the jacket 912 and translucent material 928 are coextruded around the second optical fiber 916, which is drawn from a payoff and passed through the extruder during manufacturing of the cable 910. In still other embodiments, the second optical fiber 916 and the translucent material 928 are attached to the jacket 912 following manufacturing of the rest of the cable 910.

Figure 14:
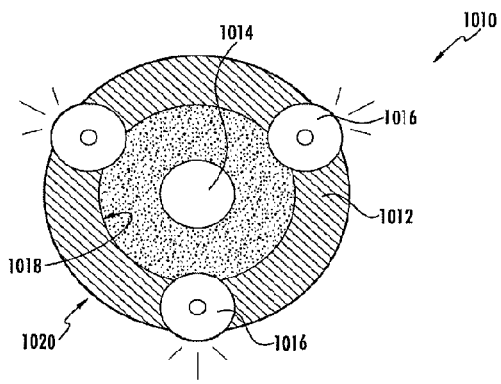

Referring to FIG. 14, the fiber optic cable 1010 includes the second optical fiber 1016, which spans or mostly spans the width of the jacket 1012, between the exterior surface 1020 and the interior surface 1018. In some embodiments, the jacket 1012 extends over the second optical fiber 1016 on either or both of the exterior surface 1020 and the interior surface 1018, providing a separation of less than 1 mm, such as less than 100 μm between the second optical fiber 1016 and area outside of or interior to the jacket 1012.

According to one embodiment, in addition to providing a visual trace of the cable 1010, the second optical fiber 1016 may serve as a tearing point or guide line for removing a portion of the jacket 1012 (e.g., a flap of the jacket 1012) to access components within the conduit defined by the interior surface 1018 of the jacket 1012, such as the first optical fiber 1014. Such an access system is further discussed in International Application Nos. PCT/US11/62002, PCT/US11/57574, and PCT/US11/34309.

Figure 15:
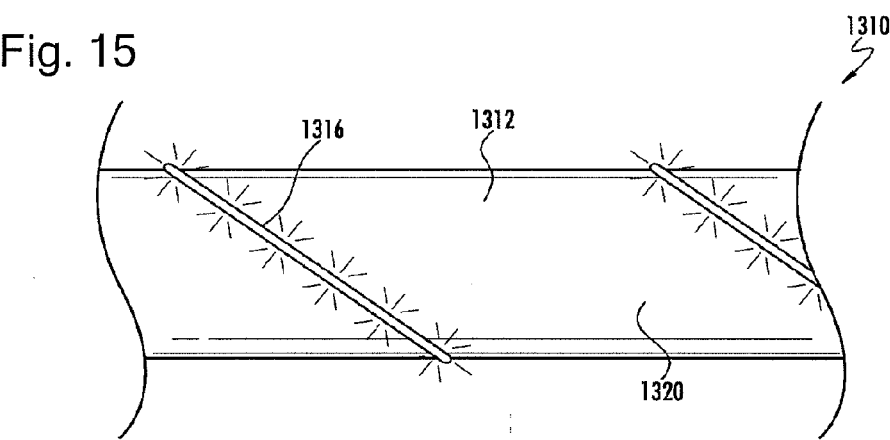
FIG. 15 illustrates an optical fiber cable assembly where the optical tracer fiber is wound about a longitudinal axis of the optical fiber cable assembly.

Referring to FIG. 15, the present disclosure contemplates an optical fiber cable assembly 1310 where the optical tracer fiber 1316 is wound about a longitudinal axis of the optical fiber cable assembly 1310. The optical tracer fiber 1316 can be physically coupled, e.g., secured to or fully or partially embedded in, the exterior surface 1320 of cable jacket 1312 or can be contained within an inside diameter of the cable jacket 1312, as is illustrated above in the various embodiments of FIGS. 7-14. Constructing the optical fiber cable assembly 1310 in this manner allows the optical tracer fiber 1316 to be viewable regardless of the particular orientation of the cable assembly 1310 relative to the viewer. Furthermore, the tracer winding tends to reduce stresses on the optical fiber 1316 when the cable assembly 1310 bends.

In one embodiment, the optical tracer fiber 1316 can be secured to the jacket 1312 following extrusion of the jacket 1312, such as with an adhesive. In other contemplated embodiments, the optical tracer fiber 1316 can be extruded into or co-extruded with the jacket 1312 by including a rotating feeder, extrusion head, or nozzle for distributing the material of the optical tracer fiber 1316. Two or more tracer fibers 1316 may be helically wound around the exterior surface 1320 of the jacket 1312. The optical fibers 1316 may be wound in the same direction or counter-helically wound to crisscross one another. In addition, it is contemplated that the optical tracer fiber 1316 can be wound about the longitudinal axis of the optical fiber cable assembly with a variable periodicity or rotation, which may be random or not. As a further alternative, it is also contemplated that the optical tracer fiber 1316 can be wound about the longitudinal axis of the optical fiber cable assembly in an alternating bidirectional helix in the manner disclosed in U.S. Pat. No. 8,161,721, or in any type of oscillating fashion.

The optical tracer fiber 1316 is particularly well suited for winding about the exterior surface 1320 of the jacket 1312 because it defines an outside diameter that is much smaller than the outside diameter of the cable jacket 1312. For example, it is contemplated that the outside diameter of the optical tracer fiber 1316 may be less than approximately 10% of the outside diameter of the cable jacket 1312. Contemplated tracer fiber sizes include outside diameters less than approximately 500 μm or, more preferably, outside diameters of approximately 250 μm, as fibers of this size are typically more flexible and less bend sensitive than larger fibers.

Referring to the embodiments illustrated conceptually in FIG. 15, where the optical tracer fiber 1316 is wound about the longitudinal axis of the optical fiber cable assembly 1310, for optical tracer fiber diameters of less than approximately 500 μm or, more preferably, approximately 250 μm, it is contemplated that the scattering profile of the optical tracer fiber 1316 can be engineered to generate a brightness suitable for convenient viewing in the manner illustrated in the following table, noting generally that, for the identical jacket diameters (d) and winding rates (Λ), the brightness will typically be independent of the cable length. The effective bending diameter of a fiber may be estimated as $(r^2+L^2)^{1/2}$, where r is the jacket radius (d/2) and L is $1/\Lambda$, i.e., the length of a winding half turn. The units for L, d, $\Lambda$ and brightness in the examples below are in meters, millimeters, turns/meter and $cd/m^2$, respectively. The brightness is measured at a wavelength between about 400 nm and about 700 nm, or a multiple nm wavelength range selected from between about 400 nm and about 700 nm. The examples below show cable (including pipes and conduits) diameters of 0.5 to 10 mm; cable diameters of <0.5 mm and >10 mm (e.g., between 0.2 and 0.5 mm, and between 10 and 50 mm or >50 mm can also be used).

| Cable Length (L), meters | Jacket Diameter (d), millimeters | Winding Rate ($\Lambda$), turns/meter | Brightness, $cd/m^2$ |
|---|---|---|---|
| 100-500 | 2-10 | 1-10 | >40 |
| 10-100 | 2-10 | 1-10 | >40 |
| 1-10 | 2-10 | 1-10 | >40 |
| <1 | 2-10 | 1-10 | >40 |
| 100-500 | 0.5-2 | 1-10 | >40 |
| 10-100 | 0.5-2 | 1-10 | >40 |
| 1-10 | 0.52 | 1-10 | >40 |
| <1 | 0.5-2 | 1-10 | >40 |

For example, a silica-based optical tracer fiber can be engineered to scatter approximately 15-70 dB/km at a wavelength of approximately 450 nm (depending on winding period), in which case a 500 mW source injected down the tracer fiber would produce sufficient scatter throughout a 300 m span to be visible with the naked eye—a condition that would still hold for ~70 dB/km. Generally, laser power on the order of 5-10 mW, at a wavelength of about 560 nm, is contemplated to be sufficient to make the optical tracer fiber visible. More specifically, where the optical fiber cable assembly 1310 illustrated in FIG. 15, or in any other embodiment of the present disclosure, comprises an optical tracer source, it is contemplated that the tracer scattering profile of the optical tracer fiber and the optical intensity of the optical tracer source can be engineered such that visible light at the tracer wavelength or wavelength range $\lambda_T$ is dispersed from the optical tracer fiber at a luminance that is at least about 10 $cd/m^2$ or, more preferably, at a luminance that is at least about 80 $cd/m^2$. More particularly, it is contemplated that dispersion between approximately 80 $cd/m^2$ and approximately 200 $cd/m^2$ will be suitable for many applications of the concepts of the present disclosure.

Figure 16:
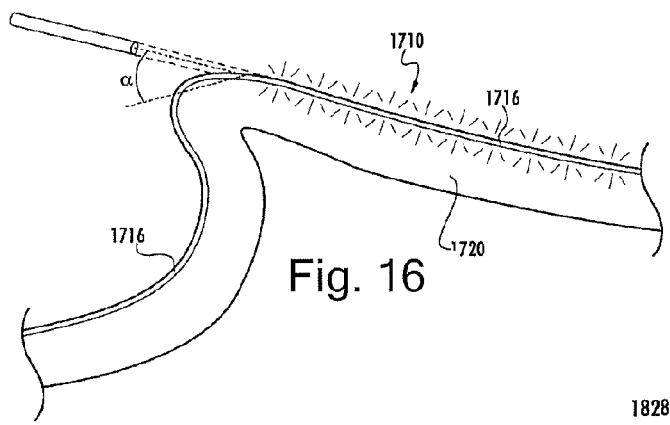
FIG. 16 illustrates an external light source and a fiber optical cable according to one embodiment of the present disclosure.
Figure 17:
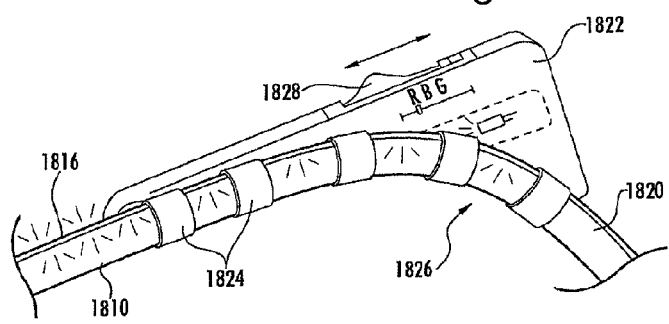
FIG. 17 illustrates a lighting device and a fiber optic cable according to another embodiment of the present disclosure.

Referring now to FIG. 16, an optical fiber 1716 integrated with the exterior surface 1720 of the fiber optic cable 1710 is configured to receive and transmit light that is supplied to the optical fiber 1716 from locations on the cable 1710 other than just the ends of the cable 1710, such as some or any position along the length of the cable 1710. An operator directs light into the optical fiber 1716 at an angle a, relative to the length of the optical fiber 1716, that is sufficient to allow some or all of the light to pass through the cladding and into the core of the optical fiber 1716. Such an angle a may be facilitated by bending the cable 1710. The materials of the cable 1710 and optical fiber 1716 integrated with the exterior surface 1720 may be selected and positioned to allow bending to achieve the angle a, so that the optical fiber 1716 receives light along the length of the cable 1710, without over-bending the glass optical fibers or other transmission elements carried internally by the cable 1710 (e.g., greater than the minimum bend radius of corresponding glass optical fiber transmission elements).

In FIG. 18, a stand-alone device 1822 (e.g., hands-free device) is used to illuminate a fiber optic cable 1810 via an optical fiber 1816 integrated with the exterior surface 1820 (e.g., jacket exterior) of the optical fiber 1810. The device 1822 may be attached to the cable 1810, such as with clips 1824, straps, or other releasable fasteners. In some embodiments, the device 1822 includes a curved channel 1826 configured to orient the optical fiber 1816 to receive light provided by the device 1822. In some embodiments, the device 1822 includes an LED-, laser-, or other light source 1828 that supplies light to the optical fiber 1810, which may direct the light into the optical fiber 1816 at the bend.

Optical data transmission fibers contemplated herein may comprise a single fiber, paired fibers, a plurality of optical fibers configured as an optical fiber ribbon, concentric bundles of optical fibers, or any other conventional or yet-to-be developed optical fiber configuration. For example, it is contemplated that the optical data transmission fibers may comprise concentric bundles of optical fibers. It is contemplated that optical tracer fibers disclosed herein may assume any location within an optical fiber cable assembly, regardless of where it lies in the cross section of the assembly—although an outermost position is most likely preferable. In many embodiments, care should be taken to ensure that the cabling media, which may include strength members, buffer tubes, etc., permits propagation of the tracer wavelength or wavelength range $\lambda_T$ or an optically visible shifted tracer wavelength or wavelength range $\lambda_T^*$ from the optical tracer fiber to the cable jacket.

It is noted that optical fiber cabling media may take a variety of conventional and yet-to-be developed forms. For example, where an optical fiber cable assembly comprises an optical waveguide disposed within a protective tube, the optical waveguide must be further protected within the tube and a certain amount of relative movement between the optical waveguide and the tube should be permitted. To this end, it is not unusual to provide water blocking tapes, yarns, woven binder threads, dry inserts, thixotropic greases, strength members, buffer tubes, fiber coatings, etc., as cabling media in the space between the optical fibers of the cable and the cable jacket, and in the space between the optical fibers themselves. These types of materials are referred to herein collectively as cabling media.

For example, un-armored and armored cable assemblies that comprise concentric bundles of tight-buffered fibers within a polymer or flame retardant polymer jacket are contemplated by the present disclosure. Cable assemblies contemplated herein may further comprise a flexible, helically wrapped or corrugated, aluminum or steel interlocking armor surrounded by a polymer or flame-retardant polymer outer jacket. Of course, it is contemplated that the concepts of the present disclosure will enjoy applicability to a wide variety of optical fiber cable configurations and should not be limited to the particular embodiments disclosed herein.

It is also noted that recitations herein of "at least one" component, element, etc., should not be used to create an inference that the alternative use of the articles "a" or "an" should be limited to a single component, element, etc. For example, reference herein to "an optical tracer fiber" should not be read to limit the description or claims to a single optical tracer fiber.

It is noted that recitations herein of a component of the present disclosure being "configured" in a particular way, to embody a particular property, or to function in a particular manner, are structural recitations, as opposed to recitations of intended use. More specifically, the references herein to the manner in which a component is or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

For example, although the various embodiments of the present disclosure are described in the context of an optical fiber cable assembly that is free of electrical components, it is contemplated that the concepts of the present disclosure, particularly the optical tracer fiber, may be utilized in electrical or opto-electrical cable assemblies. The disclosed tracer fiber may also be utilized in a variety of conduit applications including, for example, plumbing conduits, or other non-electrical and non-optical conduits.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. An optical fiber cable assembly comprising at least one optical tracer fiber, one or more optical data transmission fibers, and a cable jacket, wherein:
   the optical data transmission fibers are surrounded by the cable jacket and define a data transmission profile comprising a relatively low scattering loss of <10 dB/km at a data transmission wavelength or wavelength range $\lambda_D$ that lies in an IR portion of the optical spectrum;
   the optical tracer fiber defines a tracer scattering profile comprising a relatively high scattering loss of >15 dB/km at a tracer wavelength or wavelength range $\lambda_T$ that lies in a visible portion of the optical spectrum such that visible light at the tracer wavelength or wavelength range $\lambda_T$ is dispersed from the optical tracer fiber along at least a portion of its length, wherein the optical tracer fiber is configured such that the visible light at the tracer wavelength or wavelength range $\lambda_T$ is capable of being dispersed from zero-bend portions of the optical tracer fiber at a luminance that is at least about 80 cd/m2;
   the optical tracer fiber is embedded in the cable jacket or contained within an inside diameter of the cable jacket such that the dispersed visible light from the optical tracer fiber must pass through the cable jacket before exiting the optical fiber cable assembly;
   the cable jacket is engineered to generate light at an optically visible shifted tracer wavelength or wavelength range $\lambda_T^*$ from visible light at the tracer wavelength or wavelength range $\lambda_T$ along at least a portion of a length of the optical fiber cable assembly,
   wherein the cable jacket comprises a fluorescent component that generates the optically visible shifted tracer wavelength or wavelength range $\lambda_T^*$ upon propagation of the tracer wavelength or wavelength range $\lambda_T$ from the optical tracer fiber through the cable jacket;
   the optical fiber cable assembly is configured such that the dispersed visible light at the optically visible shifted tracer wavelength or wavelength range $\lambda_T^*$ is visible from an exterior of the optical fiber cable assembly; and
   wherein the optical tracer fiber is configured to receive light that is supplied to the optical tracer fiber from locations other than ends of the optical tracer fiber, wherein at least a portion of the cladding of the optical tracer fiber allows at least some light to pass through the cladding and into the core of the optical tracer fiber at a location other than the ends of the optical tracer fiber.

2. An optical fiber cable assembly as claimed in claim 1 wherein:
   the cable jacket comprises an optically reflective material; and
   the optical tracer fiber is partially embedded in the cable jacket or secured to an outer periphery of the cable jacket such that a portion of the dispersed visible light from the optical tracer is reflected by the optically reflective material of the cable jacket to exit the optical fiber cable assembly.

3. An optical fiber cable assembly as claimed in claim 1 further comprising a coating on the optical tracer fiber, wherein the coating does not comprise the fluorescent component.

4. An optical fiber cable assembly comprising at least one optical tracer fiber, one or more optical data transmission fibers, and a cable jacket, wherein:
   the optical data transmission fibers are surrounded by the cable jacket and define a data transmission profile comprising a relatively low scattering loss of <10 dB/km at a data transmission wavelength or wavelength range $\lambda_D$ that lies in an IR portion of the optical spectrum;

the optical tracer fiber defines a tracer scattering profile comprising a relatively high scattering loss of >15 dB/km at a tracer wavelength or wavelength range $\lambda_T$ that lies in a visible portion of the optical spectrum such that visible light at the tracer wavelength or wavelength range $\lambda_T$ is dispersed from the optical tracer fiber along at least a portion of its length, wherein the optical tracer fiber is configured such that the visible light at the tracer wavelength or wavelength range $\lambda_T$ is capable of being dispersed from zero-bend portions of the optical tracer fiber at a luminance that is at least about 80 cd/m2;

the cable jacket comprises an optically reflective material and a fluorescent component that generates the optically visible shifted tracer wavelength or wavelength range $\lambda_T^*$ upon propagation of the tracer wavelength or wavelength range $\lambda_T$ from the optical tracer fiber through the cable jacket;

the optical tracer fiber is partially embedded in the cable jacket or secured to an outer periphery of the cable jacket such that a portion of the dispersed visible light from the optical tracer is reflected by the optically reflective material of the cable jacket to exit the optical fiber cable assembly;

wherein the optical tracer fiber is configured to receive light that is supplied to the optical tracer fiber from locations other than ends of the optical tracer fiber, wherein at least a portion of the cladding of the optical tracer fiber allows at least some light to pass through the cladding and into the core of the optical tracer fiber at the locations other than the ends of the optical tracer fiber; and a lighting device attachable to the cable jacket at the locations other than the ends of the optical tracer fiber, wherein the lighting device comprises a curved channel configured to orient the optical tracer fiber to receive light from a lighting element in the lighting device.

5. An optical fiber cable assembly as claimed in claim 4 wherein the optical tracer fiber is fully or partially embedded in the cable jacket or secured to an outer periphery of the cable jacket.

6. An optical fiber cable assembly as claimed in claim 5 wherein the optical tracer fiber is wound helically about the longitudinal axis of the optical fiber cable assembly.

7. An optical fiber cable assembly as claimed in claim 5 wherein the optical tracer fiber is wound about the longitudinal axis of the optical fiber cable assembly in an alternating bidirectional helix defining a variable or constant periodicity.

8. An optical fiber cable assembly as claimed in claim 5 wherein:
the optical fiber cable assembly defines a length L of between approximately 100 m and approximately 500 m and a jacket diameter d of between approximately 2 mm and approximately 10 mm;
the optical tracer fiber is wound about the longitudinal axis of the optical fiber cable assembly at a winding rate $\Lambda$ of between approximately 1 turn/meter and approximately 10 turns/m; and
the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

9. An optical fiber cable assembly as claimed in claim 5 wherein:
the optical fiber cable assembly defines a length L of between approximately 10 m and approximately 100 m and a jacket diameter d of between approximately 2 mm and approximately 10 mm;
the optical tracer fiber is wound about the longitudinal axis of the optical fiber cable assembly at a winding rate $\Lambda$ of between approximately 1 turn/meter and approximately 10 turns/m; and
the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

10. An optical fiber cable assembly as claimed in claim 5 wherein:
the optical fiber cable assembly defines a length L of between approximately 1 m and approximately 10 m and a jacket diameter d of between approximately 2 mm and approximately 10 mm;
the optical tracer fiber is wound about the longitudinal axis of the optical fiber cable assembly at a winding rate $\Lambda$ of between approximately 1 turn/meter and approximately 10 turns/m; and
the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

11. An optical fiber cable assembly as claimed in claim 5 wherein:
the optical fiber cable assembly defines a length L of between approximately 100 m and approximately 500 m and a jacket diameter d of less than approximately 2 mm;
the optical tracer fiber is wound about the longitudinal axis of the optical fiber cable assembly at a winding rate $\Lambda$ of between approximately 1 turn/meter and approximately 10 turns/m; and
the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

12. An optical fiber cable assembly as claimed in claim 5 wherein:
the optical fiber cable assembly defines a length L of between approximately 10 m and approximately 100 m and a jacket diameter d of less than approximately 2 mm;
the optical tracer fiber is wound about the longitudinal axis of the optical fiber cable assembly at a winding rate $\Lambda$ of between approximately 1 turn/meter and approximately 10 turns/m; and
the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

13. An optical fiber cable assembly as claimed in claim 5 wherein:

the optical fiber cable assembly defines a length L of between approximately 1 m and approximately 10 m and a jacket diameter d of less than approximately 2 mm;

the optical tracer fiber is wound about the longitudinal axis of the optical fiber cable assembly at a winding rate $\Lambda$ of between approximately 1 turn/meter and approximately 10 turns/m; and the optical tracer fiber is engineered to generate a brightness of greater than about 40 cd/m$^2$ at a wavelength between about 400 nm and about 700 nm, or a multiple nm wavelength range selected from between about 400 nm and about 700 nm, for the given cable length L, jacket diameter d, and winding rate $\Lambda$.

14. An optical fiber cable assembly as claimed in claim 5 wherein:
the optical tracer fiber is positioned between an inside diameter of the cable jacket and an outside diameter of the cable jacket; and
the cable jacket is visible from an exterior of the optical fiber cable assembly and is translucent or transparent to the tracer wavelength or wavelength range $\lambda_T$ or the optically visible shifted tracer wavelength or wavelength range $\lambda_T{}^*$ along at least a portion of a length of the optical fiber cable assembly.

15. An optical fiber cable assembly as claimed in claim 5 wherein the optical tracer fiber comprises a silica-based optical fiber core.

16. An optical fiber cable assembly as claimed in claim 5 wherein the optical tracer fiber defines an outside diameter that is less than approximately 10% of an outside diameter of the cable jacket.

17. An optical fiber cable assembly as claimed in claim 4 wherein the optical tracer fiber defines an outside diameter less than approximately 500 μm.

18. An optical fiber cable assembly as claimed in claim 4 wherein the optical tracer fiber defines an outside diameter of approximately 250 μm.

19. An optical fiber cable assembly as claimed in claim 4 wherein:
the optical fiber cable assembly further comprises an optical tracer source; and
the tracer scattering profile of the optical tracer fiber and the optical intensity of the optical tracer source are such that visible light at the tracer wavelength or wavelength range $\lambda_T$ is dispersed from the optical tracer fiber at a luminance that is at least about 10 cd/m$^2$.

20. An optical fiber cable assembly as claimed in claim 4 wherein:
the optical fiber cable assembly further comprises an optical tracer source; and
the tracer scattering profile of the optical tracer fiber and the optical intensity of the optical tracer source are such that visible light at the tracer wavelength or wavelength range $\lambda_T$ is dispersed from the optical tracer fiber at a luminance that is at least about 80 cd/m$^2$.

21. An optical fiber cable assembly as claimed in claim 4 wherein:
the optical fiber cable assembly further comprises an optical tracer source; and
the tracer scattering profile of the optical tracer fiber and the optical intensity of the optical tracer source are such that visible light at the tracer wavelength or wavelength range $\lambda_T$ is dispersed from the optical tracer fiber at a luminance that is between approximately 80 cd/m$^2$ and approximately 200 cd/m$^2$.

22. An optical fiber cable assembly as claimed in claim 4 wherein:
the optical tracer fiber is embedded in the cable jacket or contained within an inside diameter of the cable jacket such that the dispersed visible light from the optical tracer fiber must pass through the cable jacket before exiting the optical fiber cable assembly;
the cable jacket is engineered to generate the optically visible shifted tracer wavelength or wavelength range $\lambda_T{}^*$ from visible light at the tracer wavelength or wavelength range $\lambda_T$ along at least a portion of a length of the optical fiber cable assembly.

23. An optical fiber cable assembly as claimed in claim 22 wherein the cable jacket is engineered to generate a blue-to-green shift in the optically visible shifted tracer wavelength or wavelength range $\lambda_T{}^*$.

24. An optical fiber cable assembly as claimed in claim 4 wherein the optical fiber cable assembly comprises a plurality of optical tracer fibers.

25. An optical fiber cable assembly as claimed in claim 24 wherein the optical tracer fibers are wound about the longitudinal axis of the optical fiber cable assembly in an alternating bidirectional helix.

26. An optical fiber cable assembly as claimed in claim 24 wherein the optical tracer fibers are wound helically about the longitudinal axis of the optical fiber cable assembly.

27. An optical fiber cable assembly as claimed in claim 4 further comprising a coating on the optical tracer fiber, wherein the coating does not comprise the fluorescent component.

* * * * *